A. ZAIAUSKIS.
TREE FELLING SAW.
APPLICATION FILED MAY 14, 1921.
1,414,319.
Patented Apr. 25, 1922.
2 SHEETS—SHEET 1.
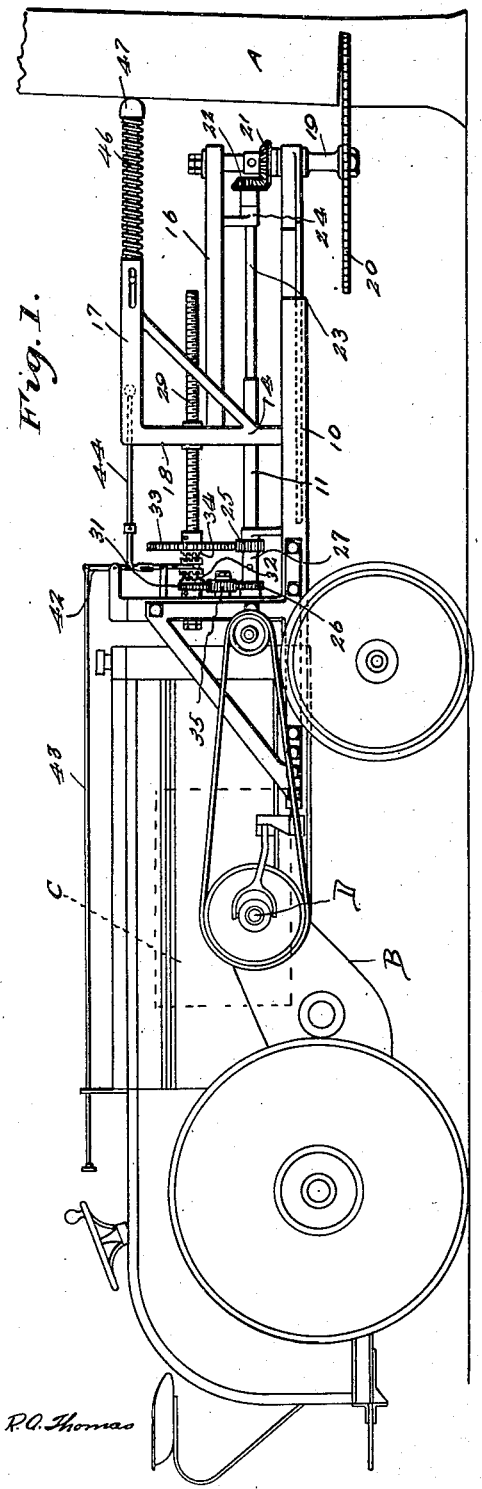
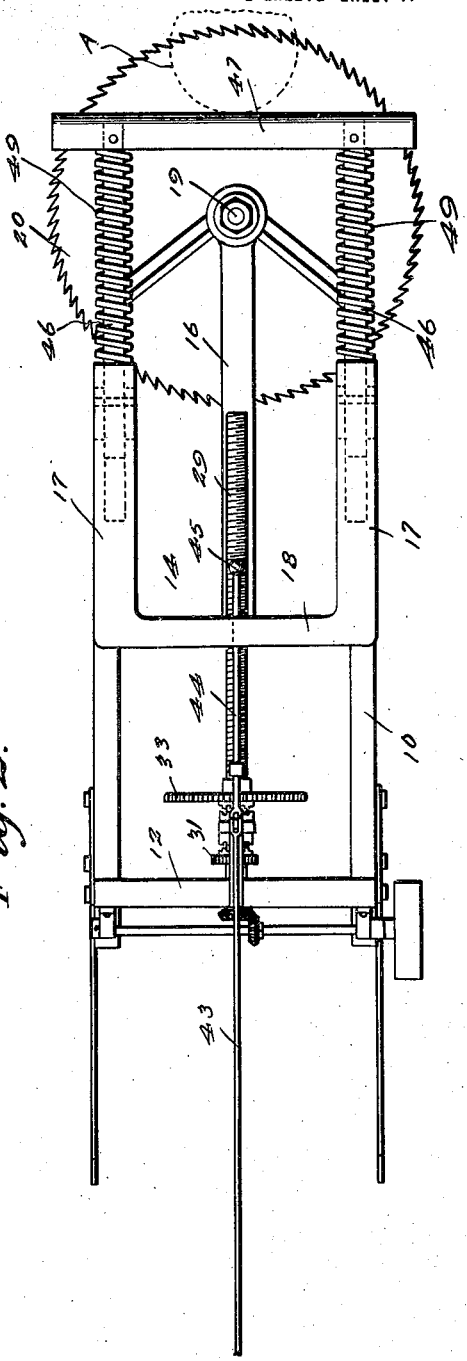
Anthony Zaiauskis INVENTOR A. ZAIAUSKIS.
TREE FELLING SAW.
APPLICATION FILED MAY 14, 1921.
1,414,319. Patented Apr. 25, 1922.
2 SHEETS—SHEET 2.
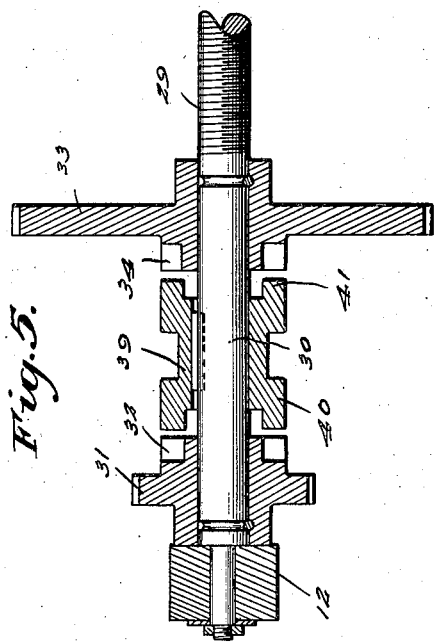
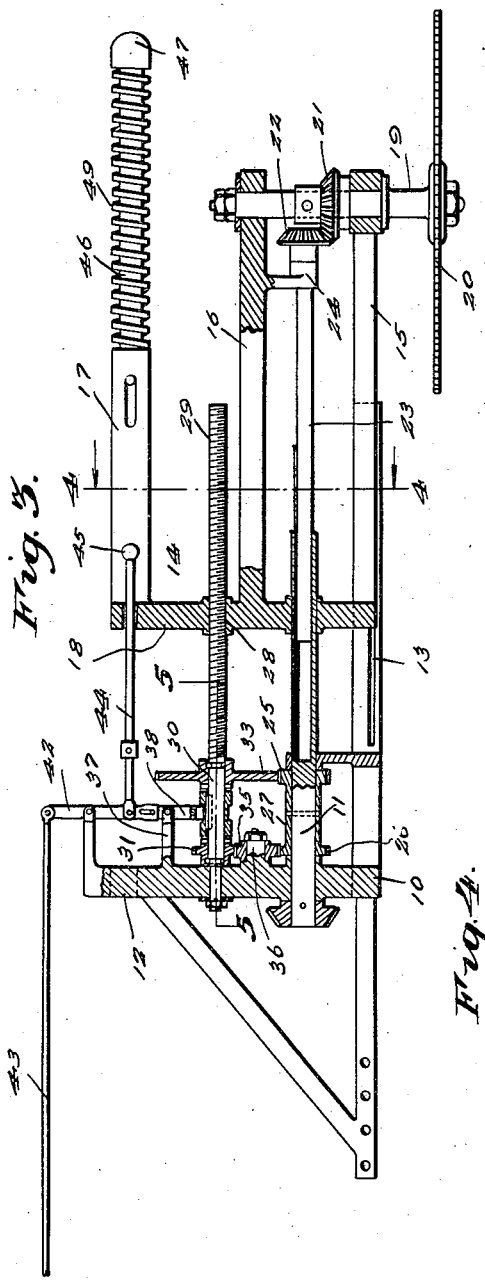
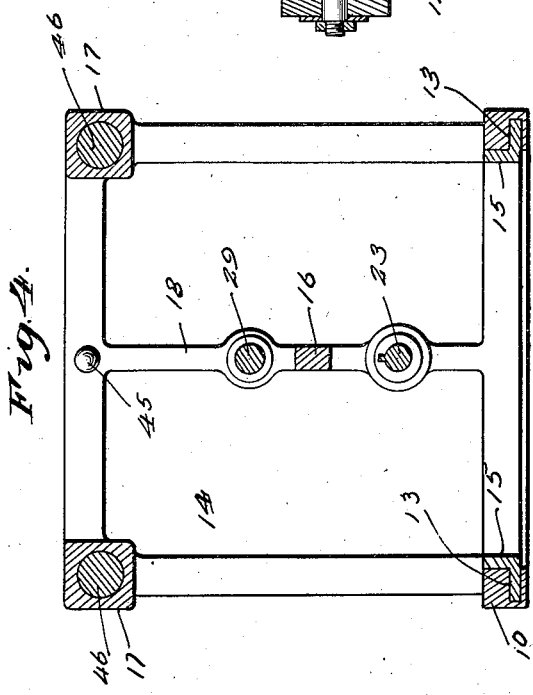
Anthony Zaiauskis INVENTOR
BY Victor J. Evans ATTORNEY
WITNESSES

UNITED STATES PATENT OFFICE.

ANTHONY ZAIAUSKIS, OF CLEVELAND, OHIO.

TREE-FELLING SAW.

1,414,319.  Specification of Letters Patent.  Patented Apr. 25, 1922.

Application filed May 14, 1921. Serial No. 469,518.

*To all whom it may concern:*

Be it known that I, ANTHONY ZAIAUSKIS, a citizen of the United States, residing at Cleveland, in the county of Cuyahoga and State of Ohio, have invented new and useful Improvements in Tree-Felling Saws, of which the following is a specification.

This invention relates to sawing devices, particularly to devices for felling trees, and has for its object the provision of a power driven horizontally disposed rotary saw adapted for cutting down trees, the device including a power driven feed whereby the saw may be fed along as the cutting progresses.

An important object is the provision of a device of this character having a gear drive provided with clutch mechanism whereby the feed may be operated to advance the saw or retract it from a cut, an automatic control being furthermore provided for throwing out the clutch when the cut is completed or nearly so.

Another object is the provision of a device of this character which is provided with a spring-pressed pusher engaging against the tree being cut, this pusher operating to start the fall of the tree when the cut has been made sufficiently far.

An additional object is the provision of a device of this character which will be comparatively simple in construction, efficient in use, durable in service, and a general improvement in the art.

With the above and other objects and advantages in view, the invention consists in the details of construction to be hereinafter more fully described and claimed and illustrated in the accompanying drawings in which Figure 1 is a side elevation of my device disposed in operative position and in the act of cutting down a tree, Figure 2 is a cross sectional view through the tree showing my device in plan, Figure 3 is a longitudinal sectional view through my device, Figure 4 is a cross sectional view, Figure 5 is an enlarged horizontal sectional view taken through the clutch mechanism and adjacent parts, Referring more particularly to the drawings, the letter A designates a tree to be cut down and B designates a tank, tractor or the like. In carrying out my invention I provide a supporting frame 10 of preferred or suitable construction and which is carried by the tank or tractor, being secured thereto by any desired means. The letter C designates the engine which might be the engine of the tank or tractor or which might, if preferred, be a separate engine. The numeral 11 designates a drive shaft mounted upon the frame 10 and driven by the engine shaft D. Formed or secured at a point spaced from one end of this platform or frame, is an upstanding support 12 and the upper face of the platform is provided between said support and the adjacent end with a guide 13.

Mounted upon the platform for sliding movement longitudinally of the guide 13, is a movable supporting member designated broadly by the numeral 14 and including a lower arm 15, an intermediate arm 16, an upper arm 17, and a vertical portion 18 from which all the arms extend. Journaled through the outer ends of the arms 15 and 16 is a vertically disposed arbor 19 carrying a circular saw 20 and also carrying a bevel gear 21 between the arms 15 and 16. Meshing with the gear 21 is a bevel gear 22 on a shaft 23 journaled through a bearing 24 on the underside of the arm 16 and also journaled through the vertical portion 18. Between the stationary support 12 and the movable support 14, the shaft 11 carries gears 25 and 26 connected by a hub portion 27. The shaft 23 is telescopically supported in the shaft 11.

Above the arm 16 the vertical portion 18 is provided with an opening within which is secured a nut member 28 through which is threaded a screw 29 which terminates in a shaft portion 30 journaled through the support 12. The shaft 11 from the motor or engine is operatively connected with this shaft 30 whereby to effect driving thereof. Secured upon the shaft 30 is a spur gear 31 which carries a clutch face 32. Also secured upon the shaft 30 adjacent the screw-threaded portion 29 thereof, is a spur gear 33 having a clutch face 34. The gear 33 meshes with the gear 25 and the gear 31 meshes with an intermediate gear 35 which is rotatable on the stub shaft 36 and which is in mesh with the gear 26.

Extending from the support 12 is a bracket 37 upon which is pivoted a forked arm 38 which engages a grooved collar 39 which has clutch faces 40 and 41 adapted for engagement with the clutch faces 32 and 34, respectively.

The gears 31 and 33 are of course loose upon the shaft 30 while the clutch member or grooved collar 39 is splined thereon. The upper end of the forked lever is prolonged upwardly, as shown at 42, and is provided with a handle 43 whereby the grooved collar may be shifted to lock either the gear 33 or the gear 31 for rotation with the collar.

Slidable through the upper portion of the vertical supporting member 18 is plunger rod 44 having an enlarged free end 45 adapted to be engaged by the frame 14 for throwing the clutch mechanism into neutral position when a sufficiently deep cut has been made in the tree. The uppermost arms 17 are formed with openings through which are slidable plungers 46 having a cross head 47. These plungers 46 are surrounded by coil springs 49 which hold the plungers in extended position and in engagement with the tree being cut.

The operation of the device is as follows:

The tractor or tank carrying my device must of course first be driven to a location against the tree to be felled, the proper position being that at which the saw 20 will actually or at least nearly engage the tree to be cut when the movable support 14 is at the limit of its movement toward the stationary support 12. Assuming that the engine is operating and that the shaft 11 is rotating, the operator pushes upon the handle 43 and this will rock the forked arm so as to bring the clutch face 41 into engagement with the clutch face 34. The shaft 30 and screw 29 of course rotating, it is apparent that the movable support 14 will be moved toward the tree. As the rotation of the gear 25 will cause a slow rotation of the gear 33, and shaft 23 by virtue of the bevel gears 21 and 22 will operate the saw. As the saw rotates and cuts through the tree the member 14 carrying the saw will be correspondingly moved as to feed the saw to the tree. The spring pressed plunger 46 operates to effect pressure against the tree above the saw so that when a sufficiently deep cut has been made the spring-pressed plunger will operate to start falling of the tree. At this time the operator should of course move the handle 43 in the opposite direction to throw the sliding collar into such position that the clutch face 40 thereof will engage the clutch face 32. The gear 31 will then be rotated and this through the instrumentality of the intermediate gear 35 will cause rotation of the gear 26 and shaft 23 in the reverse direction and this will of course result in withdrawal of the movable carriage 14 away from the tree. As a matter of fact when the cut is practically made the head 45 of the plunger 44 will be engaged by 18 and pulled to swing the forked arm and move the sliding clutch collar into neutral position to stop the feed of the saw. When the engine is still running and the operator desires to render the sawing mechanism inoperative, it is of course merely necessary that the clutch sleeve 39 be moved to its neutral position, as will be obvious.

From the foregoing description and a study of the drawings it will be apparent that I have thus provided a simply constructed and easily controlled and operated sawing device which will be highly efficient for use primarily in felling trees, though it is conceivable that it might be used for different purposes and under different conditions.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a supporting platform having an upright support thereon, a movable support slidable along said platform, a vertically disposed arbor journaled in said movable support, a circular saw on said arbor, means for driving said saw, means for feeding the saw, clutch mechanism interposed between said feed and said drive means, and a pull rod engaged by said movable support at the end of its desired travel whereby to shift the clutch means into neutral position.

2. A sawing device comprising a platform having a stationary support thereon, a movable support slidable along the platform, a vertical arbor journaled in said movable support, a horizontally disposed circular saw carried by said arbor, means for driving said arbor, a rotary feed screw journaled through said stationary support and threaded through the movable support whereby to effect longitudinal movement of the latter, and a spring-pressed plunger carried by the upper portion of the movable support and normally engaging a tree being cut whereby to exert pressure on the tree above the cut.

3. A device of the character described comprising a supporting platform having a stationary support thereon, a movable support slidable longitudinally along one end portion of the platform, a vertically disposed arbor journaled in said movable support, a horizontally disposed circular saw carried by the arbor, a drive shaft journaled through the movable support and telescopically and rotatably journally mounted with relation to the stationary support, a pair of gears on said shaft, a shaft journaled through the stationary support above said first named shaft and terminating in a feed screw portion threaded through the movable support, a gear loose upon said second named shaft and meshing with one of said first named gears, a second gear loose upon said second named shaft, an intermediate gear engaging the other of said first named gears and said last named gear, clutch elements on the confronting faces of said loose gears, including a grooved collar splined upon the second named shaft and having its ends formed with clutch elements engageable selectively with said first named clutch elements, a forked lifting lever pivoted upon the stationary support and engaging said grooved collar, and an operative connection between said arbor and said first named shaft.

In testimony whereof I affix my signature.

ANTHONY ZAIAUSKIS.